United States Patent
Gunnarsson et al.

(10) Patent No.: US 10,893,445 B2
(45) Date of Patent: Jan. 12, 2021

(54) NETWORK, NETWORK NODES AND METHOD THEREIN FOR HANDLING CONNECTION IN A WIRELESS COMMUNICATION NETWORK

(71) Applicant: Telefonaktiebolaget LM Ericsson (publ), Stockholm (SE)

(72) Inventors: Fredrik Gunnarsson, Linköping (SE); Icaro L. J. Da Silva, Solna (SE); Reza Moosavi, Linköping (SE); Pradeepa Ramachandra, Linköping (SE); Claes Tidestav, Bålsta (SE); Kristina Zetterberg, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 130 days.

(21) Appl. No.: 15/572,201

(22) PCT Filed: Sep. 25, 2017

(86) PCT No.: PCT/SE2017/050925
§ 371 (c)(1),
(2) Date: Nov. 7, 2017

(87) PCT Pub. No.: WO2018/063057
PCT Pub. Date: Apr. 5, 2018

(65) Prior Publication Data
US 2018/0295543 A1    Oct. 11, 2018

Related U.S. Application Data

(60) Provisional application No. 62/401,959, filed on Sep. 30, 2016.

(51) Int. Cl.
H04L 12/801    (2013.01)
H04L 5/14    (2006.01)
(Continued)

(52) U.S. Cl.
CPC ....... H04W 36/0033 (2013.01); H04W 16/28 (2013.01); H04W 24/08 (2013.01)

(58) Field of Classification Search
CPC ............. H04W 36/0033; H04W 28/02; H04W 36/0058; H04W 36/0094; H04W 40/24
See application file for complete search history.

(56) References Cited

U.S. PATENT DOCUMENTS 9,949,192 B1 * 4/2018 Saleh .............. H04W 36/00835
2009/0122763 A1 * 5/2009 Oguchi ................. H04W 36/34
370/331

(Continued)

FOREIGN PATENT DOCUMENTS

CN    103959683 A    7/2014
CN    104365143 A    2/2015

(Continued)

OTHER PUBLICATIONS

3GPP, "Beam management in NR", 3GPP TSG-RAN WG2 Meeting #95; Agenda Item: 9.5.1.2; ASUSTek, R2-165287; 3RD Generation Partnership Project; XP051126865; http://www.3gpp.org/ftp/Meetings_3GPP_SYNC/RAN2/Docs/, Aug. 21, 2016, 1-4.

(Continued)

*Primary Examiner* — Faruk Hamza
*Assistant Examiner* — Abusayeed M Haque
(74) *Attorney, Agent, or Firm* — Murphy, Bilak & Homiller, PLLC

(57) ABSTRACT

Network node (111) and method therein for assisting a user equipment (130) to handle a connection in a wireless communication network (100) are disclosed. A first network node (111) and a second network node (112) operate in the wireless communication network (100). The first network node (111) is a serving network node for the user equipment (130). The first network node (111) determines that the user (Continued)

equipment (130) is under an idle mode coverage of the second network node (112) based on measurements associated to the user equipment (130). When a connected mode connection between the user equipment (130) and the first network node (111) is released, the first network node sends a context of the user equipment (130) to the second network node (112).

29 Claims, 11 Drawing Sheets

(51) Int. Cl.
*H04W 84/18* (2009.01)
*H04W 36/00* (2009.01)
*H04W 16/28* (2009.01)
*H04W 24/08* (2009.01)

(56) References Cited

U.S. PATENT DOCUMENTS

| | | | |
|---|---|---|---|
| 2009/0298502 A1 | 12/2009 | Hagerman et al. | |
| 2010/0195627 A1 | 8/2010 | Sundarraman et al. | |
| 2010/0316000 A1* | 12/2010 | Burbidge | H04W 68/02 370/328 |
| 2011/0158164 A1 | 6/2011 | Palanki et al. | |
| 2012/0004009 A1 | 1/2012 | Lindoff et al. | |
| 2012/0094661 A1 | 4/2012 | Frenger et al. | |
| 2013/0210491 A1* | 8/2013 | Eriksson | H04W 16/24 455/562.1 |
| 2014/0086173 A1 | 3/2014 | Sadeghi et al. | |
| 2014/0287753 A1 | 9/2014 | Schulist et al. | |
| 2014/0301337 A1 | 10/2014 | Hapsari et al. | |
| 2015/0173004 A1 | 6/2015 | Nigam et al. | |
| 2015/0208269 A1 | 7/2015 | Damnjanovic et al. | |
| 2015/0223284 A1* | 8/2015 | Jain | H04W 52/04 370/329 |
| 2015/0319701 A1 | 11/2015 | Ng et al. | |
| 2015/0326282 A1 | 11/2015 | Futaki | |
| 2016/0037425 A1 | 2/2016 | Van Lieshout et al. | |
| 2016/0057719 A1 | 2/2016 | Centonza | |
| 2016/0066255 A1 | 3/2016 | Marinier et al. | |
| 2016/0088579 A1 | 3/2016 | Harada et al. | |
| 2016/0135143 A1 | 5/2016 | Won et al. | |
| 2016/0302076 A1* | 10/2016 | Chou | H04W 52/0225 |
| 2016/0353347 A1* | 12/2016 | Jun | H04W 16/08 |
| 2017/0034812 A1* | 2/2017 | Deng | H04W 72/046 |
| 2017/0310407 A1* | 10/2017 | Le Roux | H04N 21/44227 |
| 2017/0311193 A1* | 10/2017 | Jiang | H04W 24/10 |
| 2017/0359791 A1 | 12/2017 | Onggosanusi et al. | |
| 2018/0006702 A1* | 1/2018 | Doostnejad | H04B 7/088 |
| 2018/0049080 A1 | 2/2018 | Zhang et al. | |
| 2018/0092060 A1 | 3/2018 | Won et al. | |
| 2018/0159603 A1* | 6/2018 | Kim | H04L 27/2613 |
| 2018/0368005 A1* | 12/2018 | Fukui | H04W 16/28 |
| 2019/0075526 A1* | 3/2019 | Nagaraj | H04B 7/0408 |
| 2019/0089435 A1* | 3/2019 | Mondal | H04B 7/088 |
| 2019/0104549 A1* | 4/2019 | Deng | H04B 7/0617 |

FOREIGN PATENT DOCUMENTS

| | | |
|---|---|---|
| CN | 105144787 A | 12/2015 |
| RU | 2538921 C2 | 1/2015 |
| WO | 2011120577 A1 | 10/2011 |
| WO | 2013066384 A1 | 5/2013 |
| WO | 2013144434 A1 | 10/2013 |
| WO | 2015157565 A1 | 10/2015 |
| WO | 2016003336 A1 | 1/2016 |
| WO | 2016096006 A1 | 6/2016 |
| WO | 2016148452 A1 | 9/2016 |

OTHER PUBLICATIONS

3GPP, "Intra NR Mobility (Inter gNBs Mobility)", 3GPP TSG RAN WG3 meeting #93; R3-161705; 3RD Generation Partnership Project (3GPP), Agenda Item 10.4.1; XP051134877, http://www.3gpp.org/ftp/tsg_ran/WG3_IujTSGR3_93/Docs/, Aug. 22, 2016-Aug. 28, 2016, 1-5.

Prados-Garzon, Jonathan et al., "Handover Implementation in a 5G SDN-based Mobile Network Architecture", 2016 IEEE 27th Annual IEEE International Symposium on Personal, Indoor and Mobile Radio Communications (PIMRC): Mobile and Wireless Networks; XP033035568, Sep. 4, 2016, 1-6.

3GPP, "Beam management in NR", 3GPP TSG-RAN WG2 Meeting #95; Agenda Item: 9.5.1.2; ASUSTek, R2-165287; 3RD Generation Partnership Project; XP051126865, http://www.3gpp.org/ftp/Meetings_3GPP_SYNC/RAN2/Docs/., Aug. 21, 2016, pp. 1-4.

3GPP, "Intra NR Mobility (Inter gNBs Mobility)", 3GPP TSG RAN WG3 meeting #93; R3-161705; 3RD Generation Partnership Project (3GPP), Agenda Item 10.4.1; XP051134877, http://www.3gpp.orgiftpitsg_ran/WG3_IujTSGR3 93/Docs/Section 2.1, Aug. 13, 2016, pp. 1-5.

Prados-Garzon, Jonathan, et al., "Handover Implementation in a 5G SDN-based Mobile Network Architecture", 2016 IEEE 27th Annual IEEE International Symposium on Personal, Indoor and Mobile Radio Communications. (PIMRC), XP033035568, Sep. 4, 2016, pp. 1-6.

Ramachandra, Pradeepa, et al., "On Automatic Establishment of Relations in 5G Radio Networks", 2016 IEEE 27th Annual International Symposium on Personal, Indoor, and Mobile Radio Communications (PIMRC); Workshop: 6th International Workshop on Self-Organizing Networks (IWSON), Sep. 4, 2016, pp. 1-6.

3GPP, "Inter-node ping-pong avoidance in state transition," 3GPP TSG-RAN WG2 Meeting #95bis, R2-166927, Kaohsiung, Taiwan, Oct. 10-14, 2016, pp. 1-4.

"Solution on Handover procedure for difference SSC modes", 3GPP SA WG2 Meeting #115; S2-162607; Nanjing, China, May 23-27, 2016, pp. 1-3.

"Solution: Mobility Options", 3GPP SA WG2 Meeting #114; S2-161625; Sophia Antipolis, FR, Apr. 11-15, 2016, pp. 1-5.

"3GPP TR 23.799 V0.6.0", 3rd Generation Partnership Project; Technical Specification Group Services and System Aspects; Study on Architecture for Next Generation System (Release 14), Jul. 2016, pp. 1-321.

"Research on Distributed Radio Resource Management in Ultra Dense Networks for 5G Communication Systems", Beijing Jiantong University, Mar. 2016, pp. 1-71. (English abstract included on pp. 7-8).

* cited by examiner

NETWORK, NETWORK NODES AND METHOD THEREIN FOR HANDLING CONNECTION IN A WIRELESS COMMUNICATION NETWORK

TECHNICAL FIELD

Embodiments herein relate to a network, network nodes and methods therein for handling connection in a wireless communication network. In particular, they relate to activation of mobility procedure in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network.

3GPP 5G New Radio (NR) is the wireless standard that will become the foundation for the next generation of mobile networks. FIG. 1 depicts an overview of the downlink (DL) based active mode mobility solution proposed for 3GPP 5G NR.

As shown in FIG. 1, a UE is served by the leftmost network node, i.e. the serving node 1, but is traveling in the direction towards the rightmost network node 2, depicted by the dashed arrow in the figure. The UE uses the best "home Mobility Reference Signal" (MRS) for coarse timing estimation and radio link quality monitoring and failure detection, denoted by the dot filled oval in the figure. Alternative names instead of MRS may be Active Mode Synch Signal (AMSS), active mode reference signal or Channel State Information Reference Signal (CSI-RS), NR Synchronization Signal (NR-SS), all will be referred to as reference signal hereafter.

In addition, the UE monitors a sparse periodic MRS from the serving network node 1 and compares it with similar periodic and sparse MRSs from potential target network nodes, e.g. the network node 2. When a target network node becomes relevant for a more detailed handover procedure additional dynamically configured home MRSs from the serving network node 1 and dynamically configured away MRSs from the target network node, e.g. the network node 2, may be activated.

Furthermore, the serving network node 1 may maintain a timing advance information that is shared with the UE to inform about how much in advance in relation to the determined downlink timing the UE shall start transmitting uplink (UL) signals.

The final handover decision is taken by the network and it is based on UE reports containing measurements of home MRSs and away MRSs.

An example of a proposed system information acquisition for 5G NR is depicted in FIG. 2. In the example each network node, which may also be referred as RBS, eNB, gNB, transmission and reception point (TRP), transmits a synchronization signal or a system signature signal (SS or xSS). Together with the SS each network node also transmits a physical broadcast channel (PBCH) containing some of the minimum system information that the UE needs to access the network. This part of the minimum system information is denoted as Master Information Block (MIB) in the figure. The transition of SS and the PBCH containing the MIB is denoted with dot filled ovals in the figure.

By reading the MIB the UE receives information on how to receive the System Information Block (SIB) table. The SIB table may be transmitted using a broadcast format such as single frequency network (SFN) transmission and it is depicted with a dashed oval in the figure.

In addition to the minimum system information that is periodically broadcasted by the SS+MIB and in the SIB-table the UE may receive other system information e.g. by a dedicated transmission after initial access is established, depicted with an oval with label "Additional SI transmission" in the figure.

Traditionally, when the UE establishes a connection to the network, the serving RBS retrieves or establishes a UE context based on information from the core network and the UE. When the connection is released, the UE context is removed. When the UE reconnects, the UE contexts needs to be reestablished. An alternative discussed for 5G NR is to maintain the UE context in the RBS for some time after release to facilitate the reestablishment of the connection within a short time.

5G NR is designed to support high gain and dynamic beamforming, e.g. by means of utilizing hundreds of antenna elements at the base station, so called massive Multi-Input-Multi-Output (MIMO). It is therefore possible to maintain a connection with a UE despite that it is beyond an idle mode coverage of the serving network node. The idle mode coverage is defined by the system information or system signature signal coverage, of the serving network node. FIG. 3 depicts an example of problems identified in prior art. In this case, the UE is served via a narrow high-gain beam associated to active mode $SS_m$ by a network node 1 associated to $xSS_1$ which is far beyond its idle mode coverage. When the UE connection is released, the UE will instead select a different node, e.g. the network node 2 associated to $xSS_2$ to camp on. If the UE will establish a connection again, it will initiate the connection with a network node where the context is not available, and that network node may not be able to provide a high-gain beam.

SUMMARY

Therefore it is an object of embodiments herein to provide an improved connection establishment for a user equipment in a wireless communication network.

According to a first aspect the object is achieved by a method performed in a first network node for assisting a user equipment to handle a connection in a wireless communication network. The first network node and a second network node operates in the wireless communication network, and wherein the first network node is a serving network node for the user equipment.

The first network node determines that the user equipment is under an idle mode coverage of the second network node based on measurements associated to the user equipment. When a connected mode connection between the user equipment and the first network node is released, the first network node sends a context of the user equipment to the second network node.

According to some embodiments, the first network node may obtain the measurements from the user equipment or may obtain the measurements by measuring uplink signals received from the user equipment.

The measurements may comprise a direction estimate of the user equipment based on signal strength measurements associated to beams. The direction estimate of the user equipment may be based on a direction of the beam associated to the strongest reference signals, or based on directions of several beams associated to measured reference signals. The measurements may comprise estimated idle mode coverage. Then the first network node may request the user equipment to estimate its idle mode coverage and receive the estimated idle mode coverage from the user equipment.

According to some embodiments, the first network node may further determine that the user equipment 130 is under an idle mode coverage of the second network node 112 based on a mapping containing a predicted idle mode coverage of a network node and measurements associated to the user equipment 130.

The context of the user equipment may include historical connected mode information which may comprise information on any one or more out of a serving antenna sector, a serving beam, an antenna pre-coder, a timing advance.

According to some embodiments, the first network node may further receive a handover request from a second network node and establish a connection with the user equipment.

According to a second aspect the object is achieved by a method performed in a second network node in a wireless communication network for assisting a user equipment to handle a connection in a wireless communication network. The second network node and a first network node operates in the wireless communication network.

The second network node obtains a context of the user equipment from the first network node and establishes a connection with the user equipment based on the obtained context.

The context of the user equipment may include historical connected mode information.

The second network node may further send a handover request to a first network node. The handover request may comprise historical connected mode information of the user equipment.

According to a third aspect the object is achieved by a method performed in a wireless communication network for assisting a user equipment to handle a connection. The wireless communication network comprises a first network node and a second network node, and the first network node is a serving network node for the user equipment.

The user equipment measures reference signals, transmitted from the first and second network nodes. The first network node determines whether the user equipment is outside an idle mode coverage of the first network node and/or under an idle mode coverage of the second network node.

When a connection between the user equipment and the first network node is released, the first network node sends a context of the user equipment to the second network node. Then the second network node establishes a connection to the user equipment.

According to some embodiments, the second network node may send a handover request to the first network node, and the first network node may establish a connection to the user equipment 130.

The handover request may comprise historical connected mode information of the user equipment.

According to a fourth aspect the object is achieved by a first network node for assisting a user equipment to handle a connection in a wireless communication network. The first network node and a second network node operates in the wireless communication network, and wherein the first network node is a serving network node for the user equipment.

The first network node is configured to determine that the user equipment is under an idle mode coverage of the second network node based on measurements associated to the user equipment. When a connected mode connection between the user equipment and the first network node is released, the first network node is configured to send a context of the user equipment to the second network node.

According to some embodiments, the first network node may be configured to obtain the measurements from the user equipment or obtain the measurements by measuring uplink signals received from the user equipment.

The measurements may comprise a direction estimate of the user equipment based on signal strength measurements associated to beams. The direction estimate of the user equipment may be based on a direction of the beam associated to the strongest reference signals, or based on directions of several beams associated to measured reference signals. For example if two beams are measured as equally strong, then the direction to the UE is in between the directions of the two beams.

The measurements may comprise estimated idle mode coverage. Then the first network node may request the user equipment to estimate its idle mode coverage and receive the estimated idle mode coverage from the user equipment.

According to some embodiments, the first network node may further be configured to determine that the user equipment is under an idle mode coverage of the second network node based on a mapping containing a predicted idle mode coverage of a network node and measurements associated to the user equipment.

The context of the user equipment may include historical connected mode information which may comprise information on any one or more out of a serving antenna sector, a serving beam, an antenna pre-coder, a timing advance.

According to some embodiments, the first network node may further be configured to receive a handover request from a second network node and establish a connection with the user equipment.

According to a fifth aspect the object is achieved by a second network node in a wireless communication network for assisting a user equipment to handle in a wireless communication network. The second network node and a first network node operates in the wireless communication network.

The second network node is configured to obtain a context of the user equipment from the first network node and establish a connection with the user equipment based on the obtained context.

The context of the user equipment may include historical connected mode information.

The second network node may further be configured to send a handover request to a first network node. The handover request may comprise historical connected mode information of the user equipment.

The embodiments herein relate to a situation where UEs support a dormant state, i.e. inactive state, from which connections can be established supported by a UE context in a network node. The core essence of the embodiments herein concerns a preparation of a radio base station or a network node with a UE context from a previously served radio base station or serving network node to facilitate a future connection establishment. In addition, the preparation message may also contain historical connected mode information to help handover decision back to the previously serving network node. Therefore the embodiments herein have lots of advantages including:

By preparing and sending the context of the user equipment to the target network node, establishing a connection to the target network node may be performed accurately, fast and reliably.

The embodiments herein enable accurate, fast, reliable, and possibly on-demand, identification of network nodes transmitting a particular reference signal, such as MRS.

It works together with high gain dynamic beamforming such as massive MIMO which will be introduced in 5G-NR.

It solves the problems associated with prior art that prevents state of the art solutions for Automatic neighbour relations (ANR) to work in a 5G-NR network where the UE may hear a reference signals from a faraway base station but is not capable of receiving the associated system information transmitted from that node.

Therefore the embodiments herein provide an improved method and apparatus for assisting a user equipment to handle a connection establishment in a wireless communication network.

BRIEF DESCRIPTION OF THE DRAWINGS

Examples of embodiments herein are described in more detail with reference to attached drawings in which.

DETAILED DESCRIPTION

Figure 4:
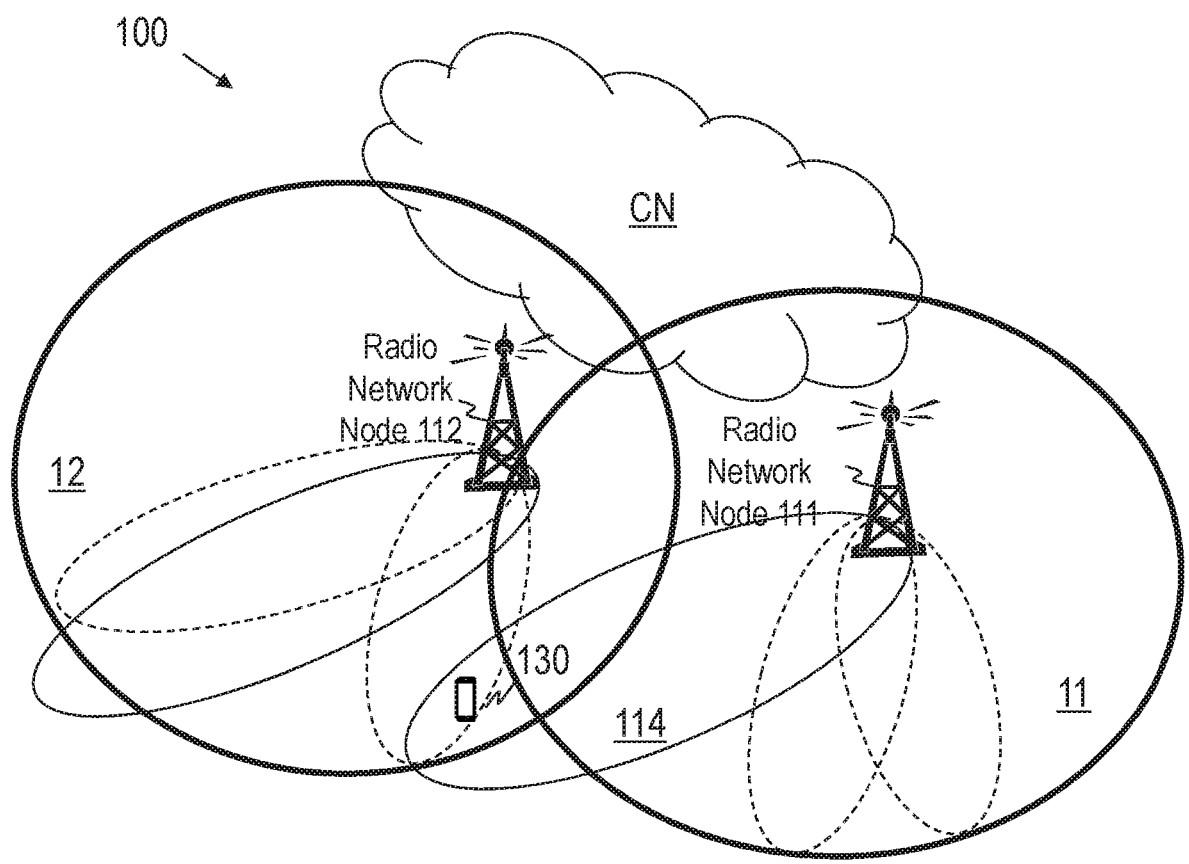
FIG. 4 is a schematic block diagram depicting embodiments of a communication network.

Embodiments herein relate to a communication network in general. FIG. 4 is a schematic overview depicting a communication network 100, in which embodiments herein may be implemented. The communication network 100 may be a wireless communications network comprising one or more RANs and one or more CNs. The communication network 100 may use a number of different technologies, such as W-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, wireless devices e.g. a user equipment 130 also referred to as UE 130, such as a mobile station, a non-access point (non-AP) STA, a STA, a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell. The terms user equipment 130, UE, UE 130 and wireless device 130 are used interchangeable herein.

Network nodes such as a first network node 111 also referred to as Radio Base Station (RBS) 111 and a second network node 112 also referred to as RBS 112 operate in the wireless communication network 100. The first network node 111 provides radio coverage over a geographical area, a service area 11, which may also be referred to as a SS broadcast area, or system area, or a beam or a beam group where the group of beams is covering the service area of a Radio Access Technology (RAT), such as 5G, LTE, Wi-Fi or similar. The second network node 112 provides radio coverage over a geographical area, a service area 12, which may also be referred to as a SS broadcast area, or system area, or a beam or a beam group where the group of beams is covering the service area of a RAT, such as 5G, LTE, W-Fi or similar. As shown in FIG. 4, the UE 130 is served by a data beam 114, i.e. an active mode beam, from the first network node 111, but with System Information coverage, i.e. the service area 12, from the second network node 112.

The first and second network nodes 111 and 112 may be a transmission and reception point e.g. a radio access network node such as a Wireless Local Area Network (WLAN) access point or an Access Point Station (AP STA), an access controller, a base station, e.g. a radio base station such as a NodeB, a gNB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the respective first and second network nodes 111 and 112 depending e.g. on the first radio access technology and terminology used. The first and second network nodes 111 and 112 may be referred to as a serving radio network node and communicates with the wireless device 130 with Downlink (DL) transmissions to the user equipment 130 and Uplink (UL) transmissions from the wireless device 130.

Figure 1:
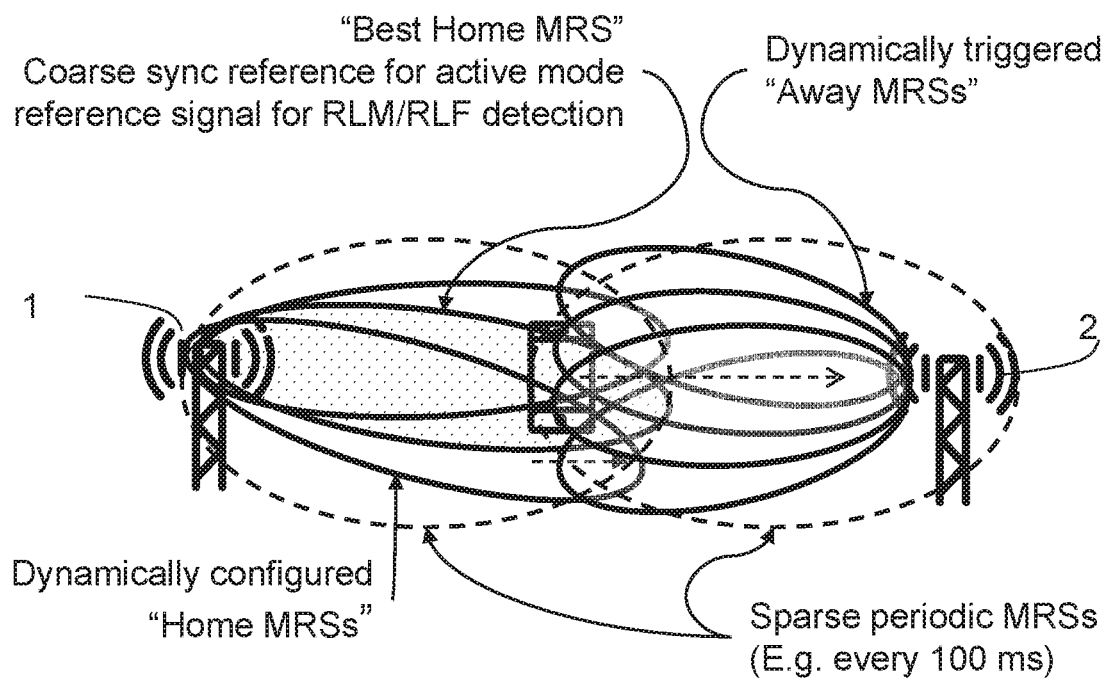
FIG. 1 is a schematic block diagram illustrating an overview of downlink based active mode mobility.
Figure 2:
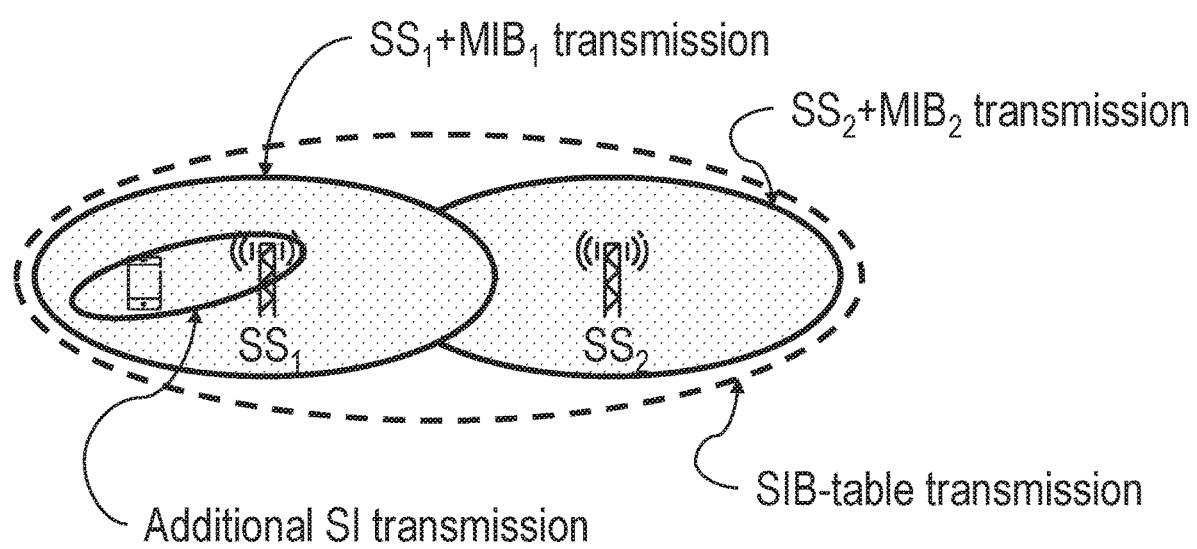
FIG. 2 is a schematic block diagram illustrating an example of system information acquisition.
Figure 3:
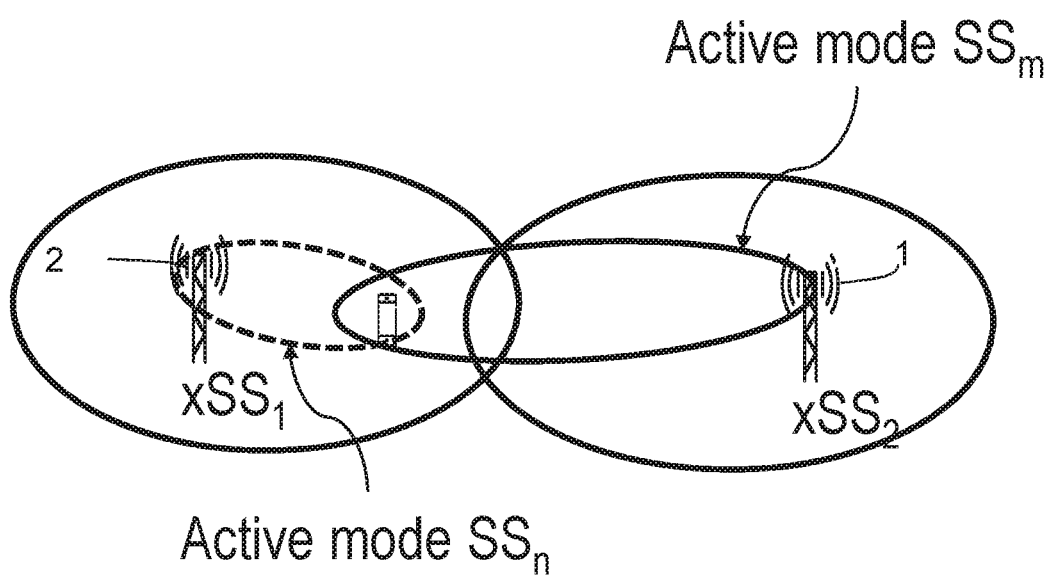
FIG. 3 is a schematic block diagram depicting an example of problems of prior art.

As part of developing embodiments herein a problem related to prior art will first be identified and shortly discussed. As discussed above with reference to FIG. 3, A UE is served by a narrow beam labeled by "Active mode $SS_m$," that has better coverage than a beam associated with $xSS_1$, from the same network node. When this UE is released from a connected state to an idle state, it will select a different beam associated with e.g. $xSS_2$. Although "Active mode $SS_m$" is used here, active mode RS without sync in NR may also be applied here.

When the UE wants to establish a network connection, the selected network node, e.g. a second network node, needs to fetch the UE context. Furthermore, it may also be of interest to resume service from the previous network node and the narrow beam again, and therefore, a handover may need to be initiated.

Embodiments herein solve the above problems by using information about the UE 130 served in connected mode by the first network node 111 to disclose that the UE 130 is outside the idle mode coverage of the first network node 111. Moreover to determine a second network node, such as the second network node 112 that would provide the best idle mode coverage. In case the connection between the first network node 111 and the UE 130 is released, the serving first network node 111 prepares the second network node 112 with the UE context, and optionally also information about the recent connection. This will enable the second network node 112 to be prepared when the UE 130 establishes a connection again with the second network node 112. Further, embodiments herein will also help the second network node 112 to determine if it is motivated to directly investigate if a handover to the first network node 111 is beneficial and initiate a handover.

Example Embodiments will be described in the following.

Figure 5A:
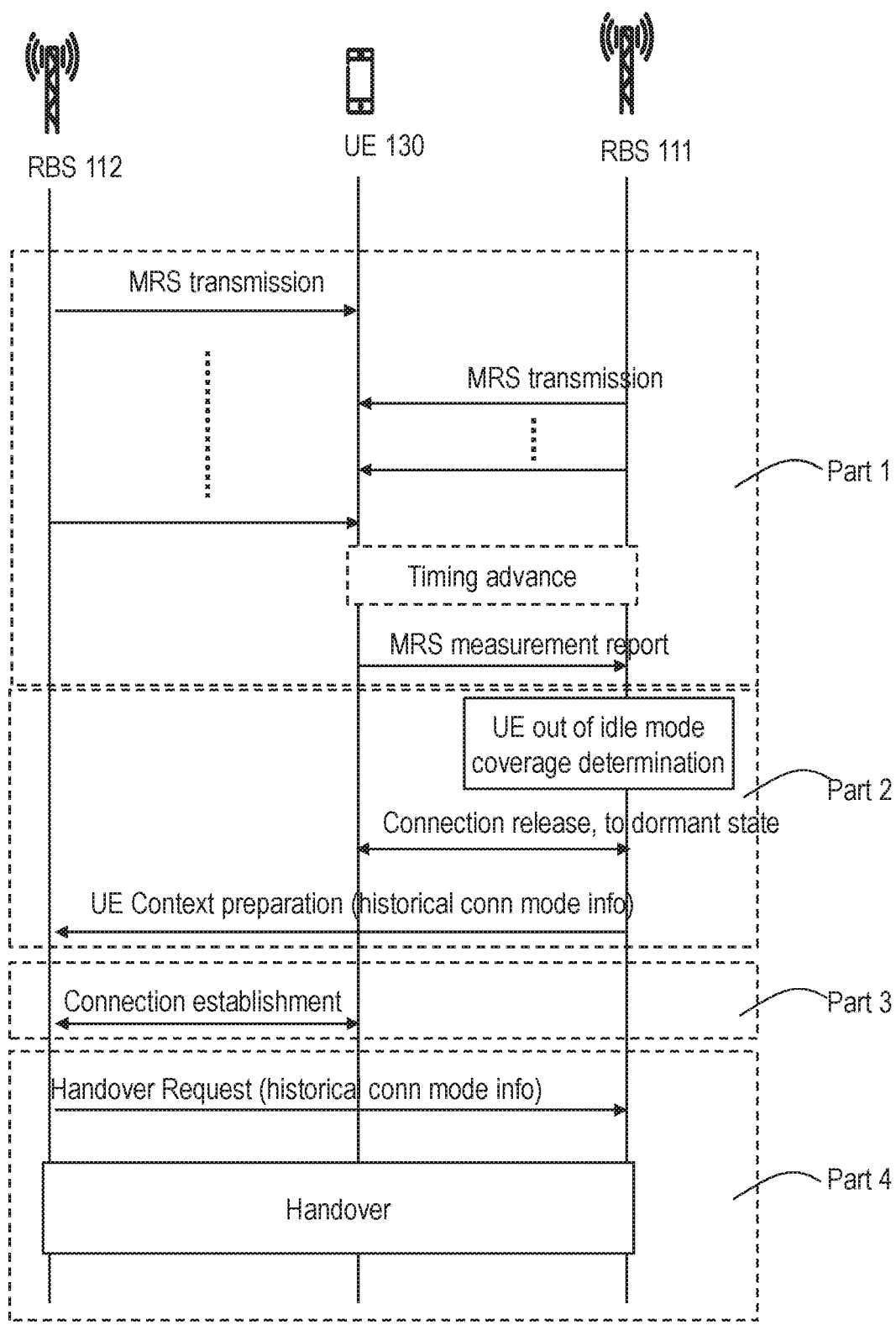
FIG. 5 a) is a signaling diagram and b) is flowchart illustrating embodiments of a method in a communication network.

FIG. 5*a* illustrates a signal flow chart of an example method in the wireless communication network 100 according to embodiments herein. The signal flow of part 1 comprises UE 130 measurements with respect to signals from both the serving RBS 111, i.e. the first network node 111 and non-serving RBS 112, i.e. the second network node 112. Such measurements may be reported to the serving network node RBS 111. The signal flow of part 1 may also comprise the serving network node RBS 111 measurements on UL signals transmitted from the UE 130, as well as procedures such as time alignment, determining a suitable timing advance for the UE 130, which essentially is a round-trip time estimate.

In one embodiment, the signal strength measurements associated to beams provide a direction estimate to the UE 130. The direction estimate may either based on the direction of the beam associated to the strongest reference signal, e.g. MRS, or based on directions of several beams associated to measured and reported MRSs. In the latter case, for example if two beams are measured as equally strong, then the direction to the UE is in between the directions of the two beams.

In another embodiment, the different available measurements, as well as knowledge about the idle mode coverage characteristics may be used to create or train a mapping from such measurements to the idle mode coverage situation. The idle mode coverage characteristics may be obtained or defined by requesting a connected mode UE to measure and report signals such as synch signals, system signatures etc. Such training may be organized as supervised clustering, where vectors of gathered measurements are labelled by what network node that provide idle mode coverage. Then, machine learning techniques may be used to train the mapping to create a function from a measured vector to a predicted idle mode coverage of a network node.

In signal flow part 2, the serving network node RBS 111 uses the obtained measurements to determine if the UE 130 is considered to be outside the idle mode coverage of the serving network node RBS 111, and to determine that the UE 130 instead is under the idle mode coverage of a second network node RBS 112. The determination may be based on a learning algorithm, using measurements and observations of whether the UE 130 is in idle mode coverage of the first network node RBS 111 or the second network node RBS 112. An alternative is to request the UE 130 to estimate its idle mode coverage and report to the serving network node RBS 111. In one embodiment, the UE 130 may estimate its idle mode coverage by detecting the most favorable xSS, and report this to the network node upon request.

When the connection between the UE 130 and the first network node RBS 111 is released, the first network node RBS 111 forwards the UE 130 context to the second network node RBS 112 to prepare in case the UE 130 establishes a connection again with the second network node RBS 112. Optionally, the first network node RBS 111 may include the historical connected mode information comprising serving beam information, or other information on serving antenna sector, an antenna pre-coder, a timing advance etc.

In signal flow part 3, when the UE 130 establishes a connection to the second network node RBS 112, the second network node RBS 112 is prepared with the UE 130 context to facilitate the connection establishment.

In the signal flow optional part 4, the second network node RBS 112 may send a handover request to the first network node RBS 111. The handover request may include historical connected mode information of the UE 130 to resume the connection via the first network node RBS 111.

Figure 5B:
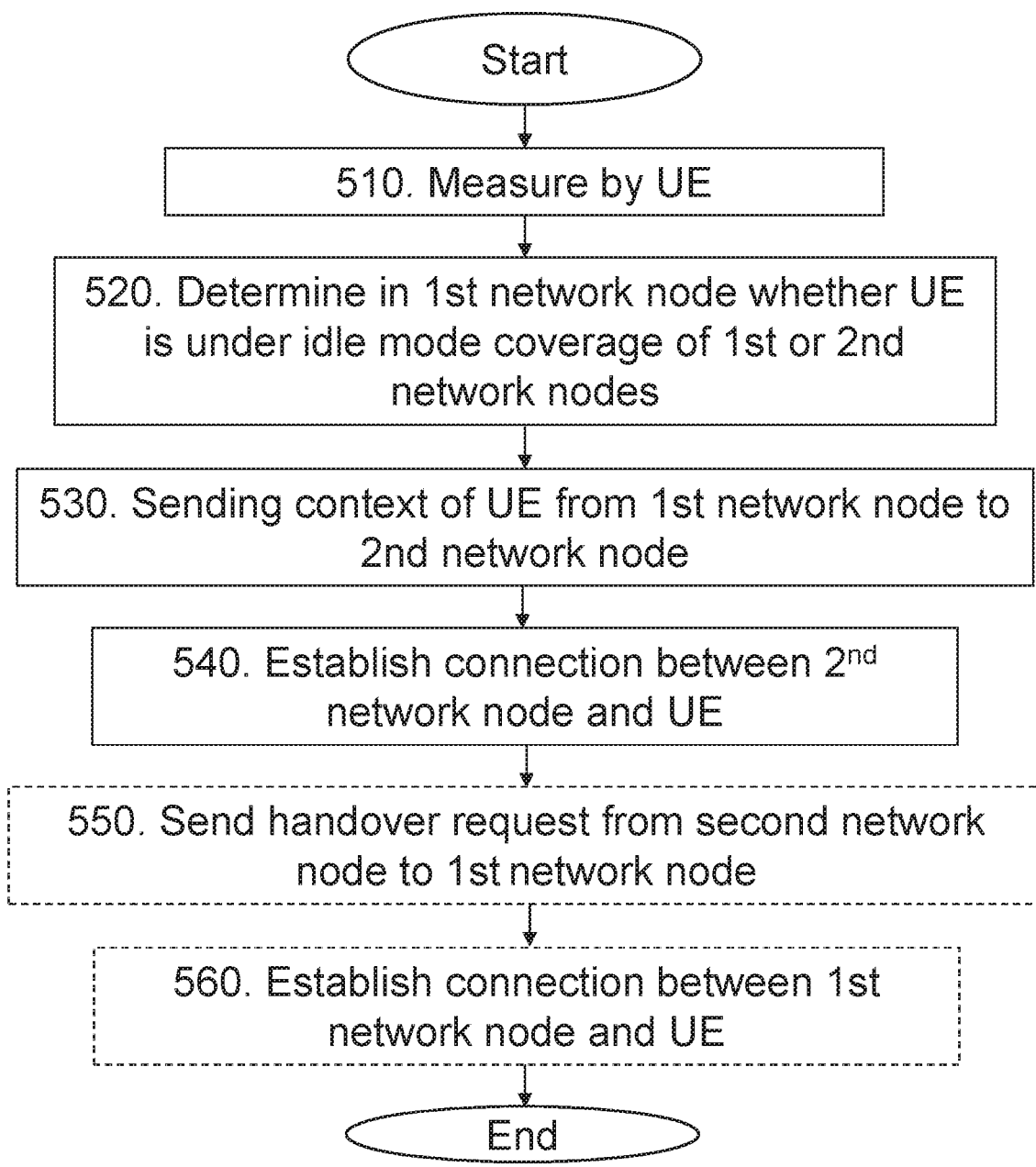

According to the signal flow chart shown in FIG. 5*a*, a method performed in the wireless communication network 100 for assisting the user equipment 130 to handle a connection is described in the following with reference to FIG. 5*b*. The wireless communication network 100 comprises the first network node 111 and the second network node 112. The first network node 111 is a serving network node for the user equipment 130.

The method comprises following actions, which actions may be performed in any suitable order:

Action 510

In order to know which network node's idle mode coverage the user equipment 130 is in, the user equipment 130 measures reference signals, e.g. MRSs, AMSSs or CSI-RSs, NR-SS etc., transmitted from the first and second network nodes 111, 112.

Action 520

Based on the measurements, the first network node 111 determines whether the user equipment 130 is outside an idle mode coverage of the first network node 111 and/or under an idle mode coverage of the second network node 112.

When it is determined that the user equipment 130 is outside an idle mode coverage of the first network node 111 and/or under an idle mode coverage of the second network node 112, following actions 530 and 540 may be performed:

Action 530

When a connection between the user equipment 130 and the first network node 111 is released, the first network node 111 sends a context of the user equipment 130 to the second network node 112 to prepare in case the UE 130 establishes a connection with the network node 112. Optionally, the first network node 111 may include the historical connected mode information comprising serving beam information, or other information on serving antenna sector, an antenna pre-coder, a timing advance etc.

Action 540

The user equipment 130 establishes a connection to the second network node 112.

According to some embodiments, the method may further comprise the following optional actions 550 and 560:

Action 550

It may be of interest to resume service from the previous network node 111 again, and therefore, a handover may need to be initiated. The second network node 112 sends a handover request to the first network node 111. The handover request may comprises historical connected mode information of the user equipment 130.

Action 560

Upon receiving the handover request, the first network node 111 establishes a connection to the user equipment 130.

Figure 6:
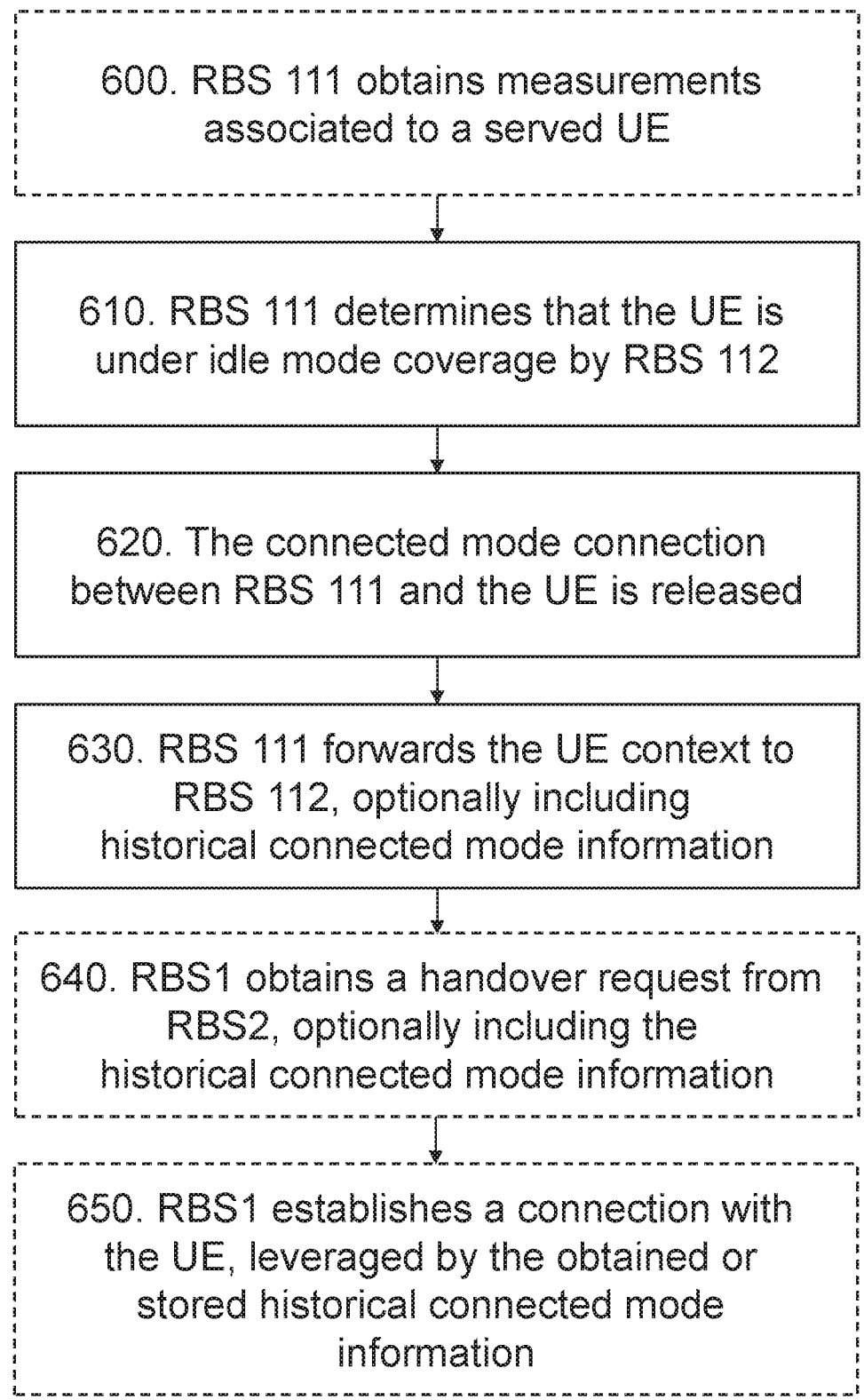
FIG. 6 is a flowchart depicting embodiments of a method from a first network node perspective.

FIG. 6 illustrates actions of a method according to embodiments herein from a first radio base station, such as the first network node 111 perspective.

Action 600

This action is optional. The radio base station, i.e. the first network node 111 may obtain measurements associated to a served UE 130.

Action 610

The first network node RBS 111 determines, for example based on the obtained measurements, that the UE 130 is not in an idle mode coverage of the first network node RBS 111, but instead is in an idle mode coverage of a second network node RBS 112.

Action 620

The connection between the UE 130 and the first network node RBS 111 is released.

Action 630

When the connection between the UE 130 and the first network node RBS 111 is released, the first network node RBS 111 forwards or sends the UE 130 context to the second network node RBS 112.

Optionally, the first network node RBS 111 may include historical connection information, i.e. the historical connected mode information of the UE 130 in the UE context. The connected mode information may comprise serving antenna sector or beam, antenna pre-coder, timing advance, etc.

When the UE 130 that has been connected to the first network node RBS 111, is released and reestablishes the connection with the second network node RBS 112 supported by a UE context forwarded from the first network node RBS 111 to the second network node RBS 112, it may happen that it is more favorable to serve the UE 130 from the first network node RBS 111 than the second network node RBS 112. Then some additional or optional actions 640 and 650 may be considered in addition to the above Actions 610-630.

Action 640

The first network node RBS 111 may obtain a handover request from the second network node RBS 112. The handover request may optionally include historical connected mode information of the UE 130. Alternatively, the first network node RBS 111 has stored historical connected mode information from a previous session with the first network node RBS 111.

Action 650

Based on the obtained or stored historical connected mode information, the first network node RBS 111 establishes a connection with the UE 130. For example, the first network node RBS 111 may base the selection of offered beams, of initial timing etc. on the historical information.

Figure 7:
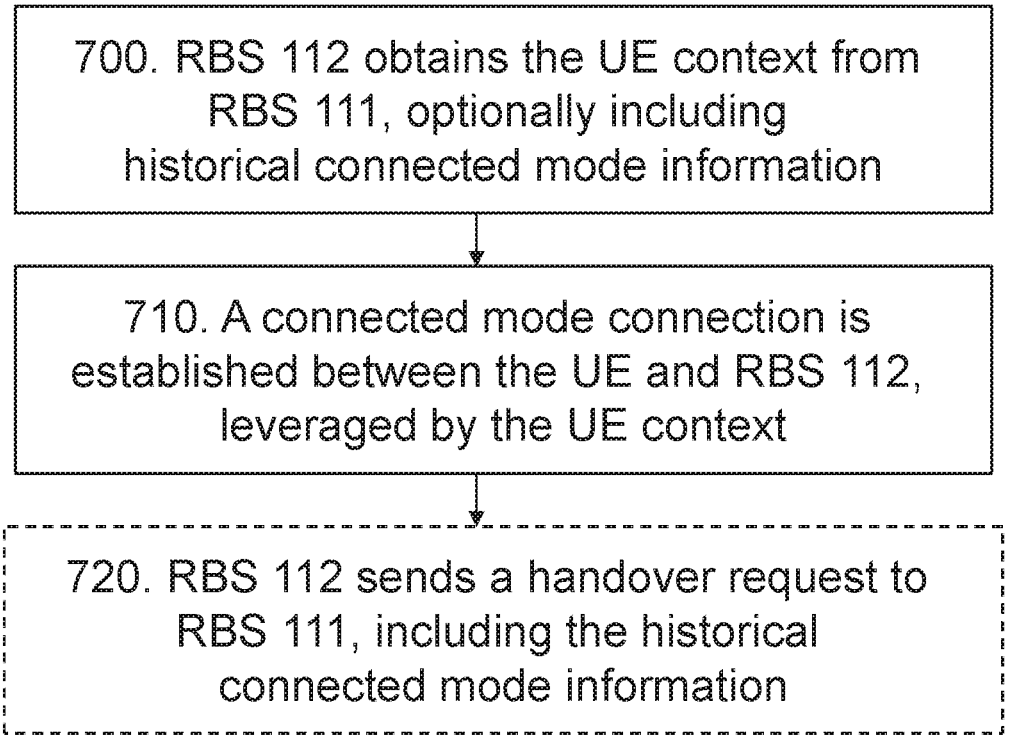
FIG. 7 is a flowchart depicting embodiments of a method from a second network node perspective.

FIG. 7 illustrates actions of a method according to embodiments herein from a second radio base station such as the second network node 112 perspective.

Action 700

The second network node RBS 112 obtains the UE context from the first network node RBS 111.

Optionally, the historical connected mode information such as best serving beam, timing advance, signal strength measurements etc. may be included in the UE context.

Action 710

The second network node RBS 112 establishes a connection with the UE 130. When the UE establishes a connection with the second network node RBS 112, the establishment is leveraged by the prepared UE context in the second network node RBS 112 comprising information about the UE, the subscription, security information etc.

Action 720

This action is optional. The second network node RBS 112 may also directly send a handover request to the first network node RBS 111 in consideration of the historical connected mode information. For example, the historical connected mode information may indicate that it is more favorable to serve the UE 130 from the first network node RBS 111 than the second network node RBS 112. It may also enable the first network node RBS 111 to resume the connection to the UE 130 promptly by using the historical connected mode information.

Figure 8:
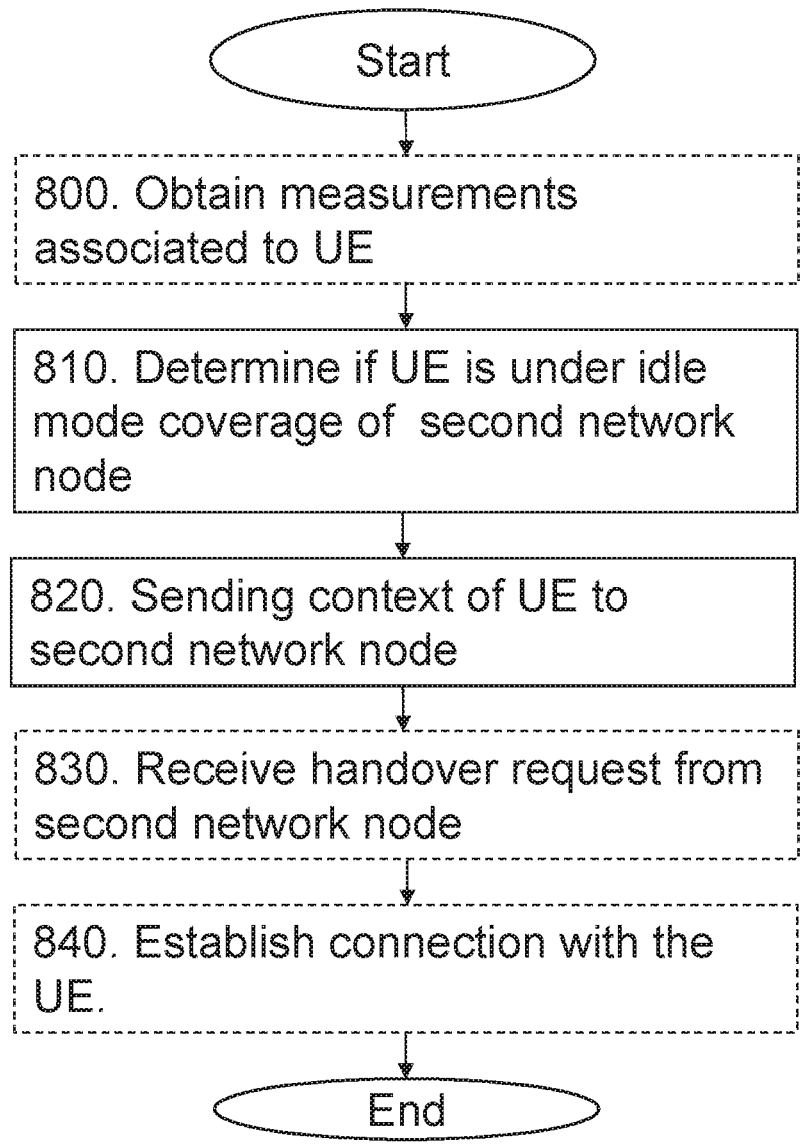
FIG. 8 is a flowchart depicting embodiments of a method performed in the first network node.

FIG. 8 is a flowchart depicting embodiments of a method performed in the first network node 111 for assisting a user equipment 130 to handle a connection in a wireless communication network 100, wherein the first network node 111 and a second network node 112 operates in the wireless communication network 100, and wherein the first network node 111 is a serving network node for the user equipment 130.

The method comprises following actions, which actions may be performed in any suitable order.

Action 800

This action is optional. The first network node 111 may obtain measurements associated to the user equipment 130.

According to some embodiments, the first network node 111 may obtain the measurements from the user equipment 130.

According to some embodiments, the first network node 111 may obtain the measurements by measuring uplink signals received from the user equipment 130.

The measurements may comprise a direction estimate of the user equipment 130 based on signal strength measurements associated to beams.

The direction estimate of the user equipment 130 may be based on a direction of the beam associated to the strongest reference signals, e.g. MRSs, or based on directions of several beams associated to measured reference signals.

According to some embodiments, the measurements may comprise estimated idle mode coverage. So the first network node 111 may request the user equipment 130 to estimate its idle mode coverage. Then the first network node 111 receives the estimated idle mode coverage from the user equipment 130.

Action 810

The first network node 111 determines that the user equipment 130 is under an idle mode coverage of the second network node 112 based on the measurements associated to the user equipment 130.

As discussed above in the example embodiments with reference to FIG. 5, the different available measurements, as well as knowledge about the idle mode coverage characteristics may be used to create or train a mapping from such measurements to the idle mode coverage situation. The idle mode coverage characteristics may be obtained or defined by requesting a connected mode UE to measure and report signals such as synch signals, system signatures etc. Such training may be organized as supervised clustering, where vectors of gathered measurements are labelled by what network node that provide idle mode coverage. Then, machine learning techniques may be used to train the mapping to create a function from a measured vector to a predicted idle mode coverage of a network node.

Therefore according to some embodiments, the first network node 111 may determine that the user equipment 130 is under an idle mode coverage of the second network node 112 based on a mapping containing a predicted idle mode coverage of a network node and measurements associated to the user equipment 130.

Action 820

When a connected mode connection between the user equipment 130 and the first network node 111 is released, the first network node 111 sends a context of the user equipment 130 to the second network node 112.

The context of the user equipment 130 may include historical connected mode information.

The historical connected mode information may comprise information on any one or more out of a serving antenna sector, a serving beam, an antenna pre-coder, a timing advance.

As discussed above, it may happen that it is more favorable to serve the UE 130 from the first network node 111 than the second network node 112, then the method may further comprise the following actions 830 and 840:

Action 830

The first network node 111 may receive a handover request from a second network node 112.

Action 840

The first network node 111 may establish a connection with the user equipment 130.

Figure 9:
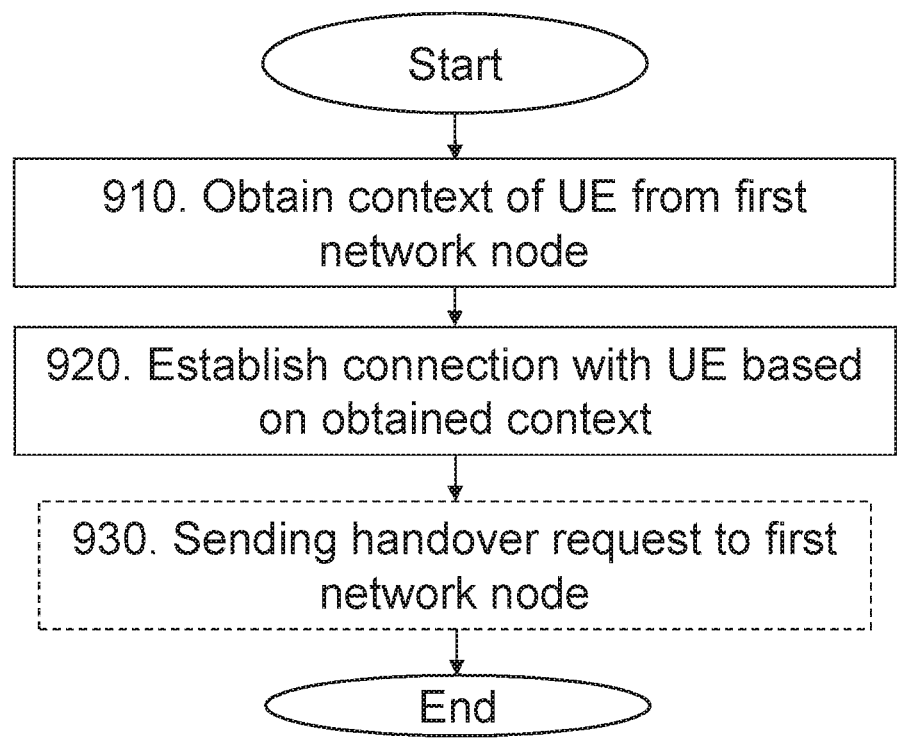
FIG. 9 is a flowchart depicting embodiments of a method performed in the second network node.

FIG. 9 is a flowchart depicting embodiments of a method performed in the second network node 112 in the wireless communication network 100 for assisting the user equipment 130 to handle a connection in the wireless communication network 100, wherein the second network node 112 and the first network node 111 operate in the wireless communication network 100.

The method comprises following actions, which actions may be performed in any suitable order.

Action 910

The second network node 112 obtains a context of the user equipment 130 from the first network node 111.

Action 920

The second network node 112 establishes a connection with the user equipment 130 based on the obtained context.

According to some embodiments, the context of the user equipment 130 may include historical connected mode information.

Action 930

The second network node 112 may send a handover request to a first network node 111, for example, if the historical connected mode information indicates that it is more favorable to serve the UE 130 from the first network node 111 than the second network node 112.

According to some embodiments, the handover request may comprise historical connected mode information of the user equipment 130.

Figure 10:
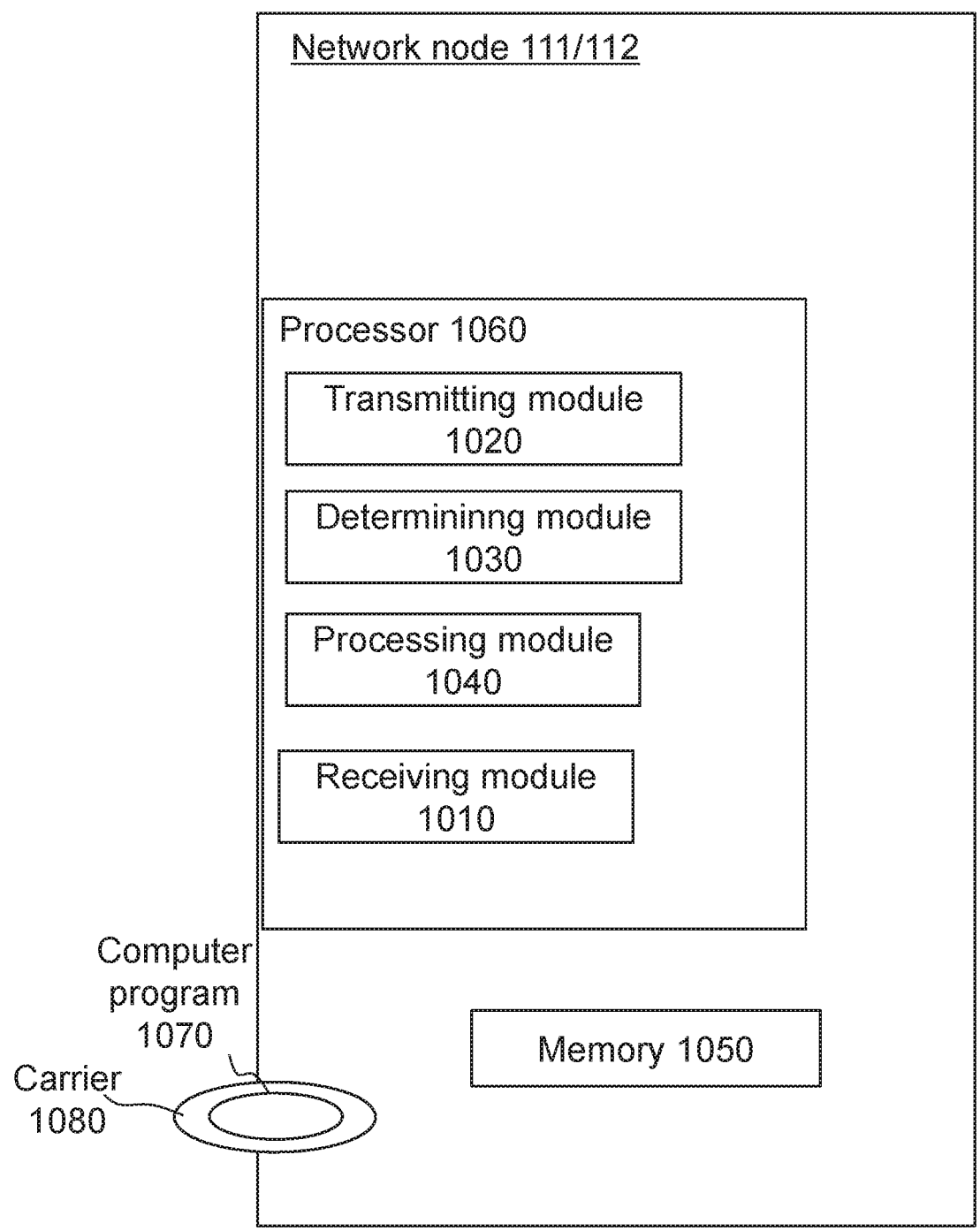
FIG. 10 is a schematic block diagram illustrating example embodiment of the first or second network node.

FIG. 10 is a schematic block diagram illustrating the first/second network node 111/112 for assisting a user equipment 130 to handle a connection in the wireless communication network 100, wherein the first network node 111 and the second network node 112 operate in the wireless communication network 100, and wherein the first network node 111 is a serving network node for the user equipment 130.

To perform the method actions in the first/second network node 111, 112, the first/second network node 111/112 comprises a receiving module 1010, a transmitting module 1020, a determining module 1030, a processing module 1040, a memory 1050 etc.

The first network node 111 is configured to, by means of e.g. the determining module 1030 being configured to, determine that the user equipment 130 is under an idle mode coverage of the second network node 112 based on measurements associated to the user equipment 130.

The first network node 111 is configured to, by means of e.g. the transmitting module 1020 being configured to, send a context of the user equipment 130 to the second network node 112 when a connected mode connection between the user equipment 130 and the first network node 111 is released.

According to some embodiments, the first network node 111 may be configured to, e.g. by means of e.g. the receiving module 1010 being configured to, obtain the measurements from the user equipment 130.

According to some embodiments, the first network node 111 may be configured to obtain the measurements by measuring uplink signals received from the user equipment 130.

According to some embodiments, the measurements may comprise estimated idle mode coverage, and the first network node 111 may be further configured to request the user equipment 130 to estimate its idle mode coverage and receive the estimated idle mode coverage from the user equipment 130.

According to some embodiments, the first network node 111 may be further configured to determine that the user equipment 130 is under an idle mode coverage of the second network node 112 based on a mapping containing a predicted idle mode coverage of a network node and measurements associated to the user equipment 130.

According to some embodiments, the first network node 111 may be further configured to receive a handover request from a second network node 112 and establish a connection with the user equipment 130.

To perform the method in the second network node 112, the second network node 112 comprises similar modules as the first network node 111 shown in FIG. 10. The second network node 112 is configured to, by means of e.g. the receiving module 1010 being configured to, obtain a context of the user equipment 130 from the first network node 111 and establish a connection with the user equipment 130 based on the obtained context.

The context of the user equipment 130 may include historical connected mode information.

According to some embodiments, the second network node 112 may further be configured to, by means of e.g. the transmitting module 1020 being configured to, send a handover request to the first network node 111.

According to some embodiments The handover request comprises historical connected mode information of the user equipment 130.

The embodiments herein relate to a situation where UEs support a dormant state, from which connections can be established supported by a UE context in a network node. The embodiments herein concerns a preparation of a radio base station or a network node with a UE context from a previously served radio base station or serving network node to facilitate a future connection establishment. In addition, the preparation message may also contain historical connected mode information to help handover decision back to the previously serving network node. Therefore the embodiments herein have lots of advantages including:

By preparing and sending the context of the user equipment 130 to the target network node, establishing a connection to the target network node may be performed accurately, fast and reliably.

The embodiments herein enable accurate, fast, reliable, and possibly on-demand, identification of network nodes transmitting a particular reference signal, e.g. MRS, AMSS or CSI-RS, NR-SS etc.

It works together with high gain dynamic beamforming such as massive MIMO which will be introduced in 5G-NR.

It solves the problems associated with prior art that prevents state of the art solutions for Automatic neighbour relations (ANR) to work in a 5G-NR network where the UE such as the user equipment 130 may hear a reference signal from a faraway base station but is not capable of receiving the associated system information transmitted from that node.

Those skilled in the art will appreciate that the receiving module 1010, the transmitting module 1020, the determining module 1030, the processing module 1040 described above in the first/second network node 111/112 may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for assisting a user equipment 130 to handle a connection in the wireless communication network 100, may be implemented through one or more processors, such as the processor 1060 in the first/second network node 111/112, together with computer program code 1070 for performing the functions and actions of the embodiments herein. The program code 1070 mentioned above may also be provided as a computer program product, for instance in the form of a data carrier 1080 carrying computer program code for performing the embodiments herein when being loaded into the first/second network node 111/112. One such carrier may be in the form of a CD ROM disc. It is however feasible with other data carriers such as a memory stick. The computer program code may furthermore be provided as pure program code on the cloud and downloaded to first/second network node 111/112.

The memory 1050 in the first/second network node 111/112 may comprise one or more memory units and may be arranged to be used to store system deployment information, measurements, mapping tables, idle mode coverage characteristics, historical connected mode information and data etc., as well as configurations and applications to perform the methods herein when being executed in the first/second network node 111/112.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "data carrier" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer program code" may be text of a computer program, parts of or an entire binary file representing a computer program in a compiled format or anything there between.

As used herein, the expression "in some embodiments" has been used to indicate that the features of the embodiment described may be combined with any other embodiment disclosed herein.

The invention claimed is:

1. A method in a first network node for assisting a user equipment to handle a connection in a wireless communication network comprising the first network node and a second network node, wherein the first network node is a serving network node for the user equipment, the method comprising:
determining that the user equipment is within an idle mode coverage of the second network node based on measurements associated with the user equipment;
when a connected mode connection between the user equipment and the first network node is released, sending a context of the user equipment to the second network node.

2. The method according to claim 1, further comprising obtaining the measurements from the user equipment.

3. The method according to claim 1, further comprising obtaining the measurements by measuring uplink signals received from the user equipment.

4. The method according to claim 1, wherein the measurements comprise a direction estimate of the user equipment based on signal strength measurements associated with radio coverage beams.

5. The method according to claim 4, wherein the direction estimate of the user equipment is based on one of: a direction of the radio coverage beam associated with a strongest reference signals, and directions of a plurality of the radio coverage beams associated with measured reference signals.

6. The method according to claim 1, wherein the measurements comprises estimated idle mode coverage, and the method further comprises:
requesting the user equipment to estimate its idle mode coverage; and
receiving the estimated idle mode coverage from the user equipment.

7. The method according to claim 1, further comprising:
determining that the user equipment is within an idle mode coverage of the second network node based on a mapping containing a predicted idle mode coverage of a network node and measurements associated with the user equipment.

8. The method according to claim 1, wherein the context of the user equipment includes historical connected mode information.

9. The method according to claim 8, wherein the historical connected mode information comprises information on any one or more out of a serving antenna sector, a serving beam, an antenna pre-coder, a timing advance.

10. The method according to claim 1, further comprising:
receiving a handover request from a second network node; and
establish a connection with the user equipment.

11. A method in a second network node in a wireless communication network for assisting a user equipment to handle a connection in a wireless communication network comprising the second network node and a first network node, the method comprising:
obtaining a context of the user equipment from the first network node, wherein the context is obtained in association with a release of a connected-mode connection between the first network node and the user equipment, wherein the context of the user equipment, obtained from the first network node, includes historical connected mode information for the user equipment in relation to the first network node; and
establishing a connection with the user equipment based on the obtained context.

12. The method according to claim 11, further comprising sending a handover request to a first network node.

13. The method according to claim 12, wherein the handover request comprises the historical connected mode information of the user equipment.

14. A method in a wireless communication network for assisting a user equipment to handle a connection, wherein the wireless communication network comprises a first network node and a second network node, and wherein the first network node is a serving network node for the user equipment, the method comprising:
measuring, in the user equipment, reference signals transmitted from the first and second network nodes;
determining, in the first network node, whether the user equipment is at least one of:
outside an idle mode coverage of the first network node and within an idle mode coverage of the second network node; and
when a connection between the user equipment and the first network node is released:
sending a context of the user equipment from the first network node to the second network node; and
establishing a connection between the user equipment and the second network node.

15. The method according claim 14, further comprising:
sending a handover request from the second network node to the first network node; and
establishing a connection between the user equipment and the first network node.

16. The method according claim 15, wherein the handover request comprises historical connected mode information of the user equipment.

17. A first network node for assisting a user equipment to handle a connection in a wireless communication network comprising the first network node and a second network node, wherein the first network node is a serving network node for the user equipment, the first network node comprising:
at least one processor; and
at least one memory storing computer-executable instructions that, when executed by the at least one processor, configure the first network node to:
determine that the user equipment is within an idle mode coverage of the second network node based on measurements associated with the user equipment;
when a connected mode connection between the user equipment and the first network node is released, send a context of the user equipment to the second network node.

18. The first network node according to claim 17, wherein execution of the instructions further configure the first network node to obtain the measurements from the user equipment.

19. The first network node according to claim 17, wherein execution of the instructions further configure the first network node to obtain the measurements by measuring uplink signals received from the user equipment.

20. The first network node according to claim 17, wherein the measurements comprise a direction estimate of the user equipment based on signal strength measurements associated with radio coverage beams.

21. The first network node according to claim 20, wherein the direction estimate of the user equipment is based on one of: a direction of the radio coverage beam associated with a strongest reference signals, and directions of a plurality of radio coverage beams associated with measured reference signals.

22. The first network node according to claim 17, wherein the measurements comprise estimated idle mode coverage, and execution of the instructions further configure the first network node to:
request the user equipment to estimate its idle mode coverage; and
receive the estimated idle mode coverage from the user equipment.

23. The first network node according to claim 17, wherein execution of the instructions further configure the first network node to:
determine that the user equipment is within an idle mode coverage of the second network node based on a mapping containing a predicted idle mode coverage of a network node and measurements associated with the user equipment.

24. The first network node according to claim 17, wherein the context of the user equipment includes historical connected mode information.

25. The first network node according to claim 24, wherein the historical connected mode information comprises information on any one or more out of a serving antenna sector, a serving beam, an antenna pre-coder, a timing advance.

26. The first network node according to claim 17, wherein execution of the instructions further configure the first network node to:
   receive a handover request from a second network node; and
   establish a connection with the user equipment.

27. A second network node in a wireless communication network for assisting a user equipment to handle a connection in a wireless communication network comprising the second network node and a first network node, the second network node comprising:
   at least one processor; and
   at least one memory storing computer-executable instructions that, when executed by the at least one processor, configure the second network node to:
      obtain a context of the user equipment from the first network node, wherein the context is obtained in association with a release of a connected-mode connection between the first network node and the user equipment, wherein the context of the user equipment, obtained from the first network node, includes historical connected mode information for the user equipment in relation to the first network node; and
      establish a connection with the user equipment based on the obtained context.

28. The second network node according to claim 27, wherein execution of the instructions further configure the second network node to send a handover request to a first network node.

29. The second network node according to claim 28, wherein the handover request comprises the historical connected mode information of the user equipment.

* * * * *